M. ALLEN.
PIPE-COUPLING.
No. 189,593. Patented April 17, 1877.
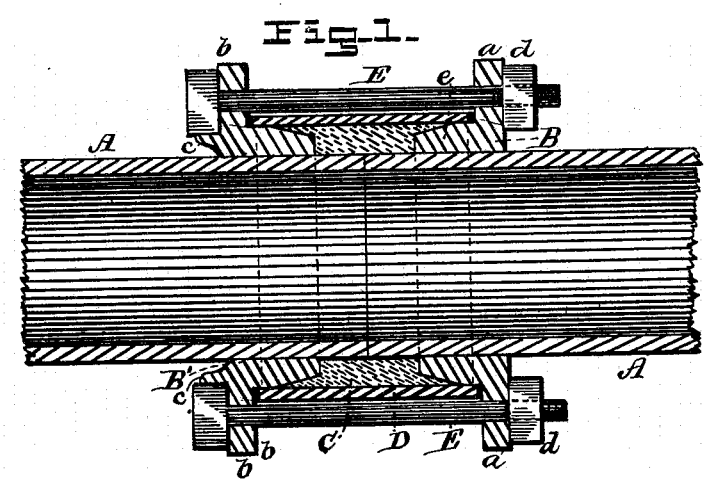
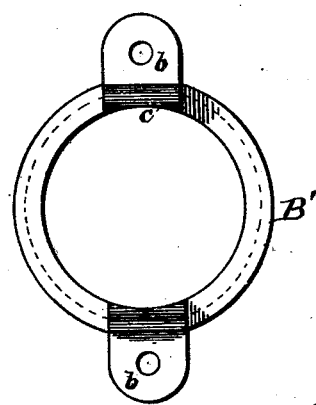
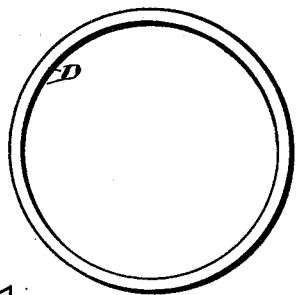
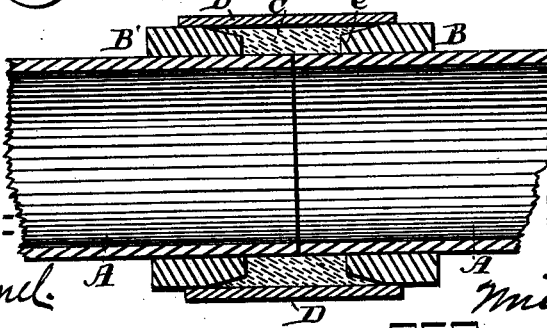
WITNESSES: Jas. T. DuHamel. H. B. Brown.
INVENTOR: Michael Allen PER H. T. Abbot. ATTORNEY.

UNITED STATES PATENT OFFICE.

MICHAEL ALLEN, OF DANVERS, MASSACHUSETTS.

IMPROVEMENT IN PIPE-COUPLINGS.

Specification forming part of Letters Patent No. 189,593, dated April 17, 1877; application filed March 26, 1877.

*To all whom it may concern:*

Be it known that I, MICHAEL ALLEN, of Danvers, in the county of Essex and State of Massachusetts, have invented certain new and useful Improvements in Pipe-Couplings; and I do hereby declare that the following is a full, clear, and exact description thereof, which will enable others skilled in the art to which it appertains to make and use the same.

This invention relates to a device for coupling the ends of pipes which have a uniform diameter throughout.

The invention consists in applying a collar to the adjacent ends of each of two pipes to be connected or joined, and connecting these collars by a sleeve placed over them, the plastic material used to cement the joint being compressed and confined between the collars and their sleeve.

In the drawing illustrating my invention, Figure 1 is a longitudinal section of my coupling complete; Fig. 2, an end view of one of the collars; Fig. 3, an end view of the collar or sleeve; and Fig. 4 shows a form of my device in which the use of bolts is dispensed with.

The letters A A represent the adjacent ends of two pipes to be joined, connected, or coupled. It will be observed that these pipes are of uniform diameters throughout—that is to say, they lack the ordinary bell-mouth on the one, and the straight end on the other, as shown in pipes now constructed for water and gas mains. To couple, join, or connect such straight-end pipes I employ rings or collars B B', which are slipped upon the pipes near their meeting ends. The plastic material C is placed over the joint. A sleeve, D, of such greater diameter than the collars as to admit of their entering it, is next slipped between the collars; and, finally, bolts E are employed to connect and securely unite the collars. These bolts E are passed through ears $a$ $b$ on the collars. The ears $b$ upon the collar B' have a flange or stop, $c$, upon them, against which the bolt-heads abut, to prevent such bolts from turning when the nuts $d$ are being screwed down upon the threaded ends of said bolts. Now, as the bolts are being tightened, the collars are drawn toward one another and within the sleeve, whereby the plastic material C is compressed between them and confined within the sleeve, forming a tight joint for the pipes; and in order that this joint may extend as far as possible with respect to the plastic material, the outer peripheries of the collars, as at $e$, are beveled, so that said material is not only compressed between the collars, but between the collars and the sleeve.

For a simpler form of my device I use collars without ears or flanges, and dispense with the bolts, and simply drive the collars in under the ends of the sleeves until the cement or other plastic material is packed close. This form of collar holds the sleeve in position until the cement sets.

I have described this device as specially applicable to straight-end pipes; but I do not wish to be understood as limiting my invention to use in connection with such pipes only.

What I claim is—

1. The combination, in a pipe-coupling, of collars B B' and sleeve D, constructed and operating substantially as described.

2. The combination, in a pipe-coupling, of collars B B', sleeve D, and bolts E, constructed and operating substantially as described.

3. A pipe-coupling having the plastic material used in cementing the joint confined between collars on the adjacent ends of pipes to be joined, and a connecting-sleeve interposed between and covering said collars, the said collars and sleeve being brought in close contact, and the plastic compressed between them by bolts extending from collar to collar, substantially as described.

In testimony that I claim the foregoing as my own I affix my signature in presence of two witnesses.

MICHAEL ALLEN.

Witnesses:
BENJ. E. NEWHALL,
D. J. HARRIGAN.